United States Patent [19]

Casterton et al.

[11] 4,344,356
[45] Aug. 17, 1982

[54] AIR DISTRIBUTION SYSTEM

[75] Inventors: Robert H. Casterton; Larry J. Phippen; Darrell L. Wright, all of Waterloo, Iowa

[73] Assignee: Deere & Company, Moline, Ill.

[21] Appl. No.: 162,402

[22] Filed: Jun. 23, 1980

[51] Int. Cl.³ .............................................. B60H 3/06
[52] U.S. Cl. ........................................ 98/2.11; 98/1.5; 98/38 F; 165/42
[58] Field of Search ............. 98/1.5, 2, 2.06, 2.07, 98/2.11, 2.14, 2.15, 3, 38 F; 62/244; 165/42, 59

[56] References Cited

U.S. PATENT DOCUMENTS

| | | | |
|---|---|---|---|
| 2,123,076 | 7/1938 | Madden | 62/244 |
| 3,401,619 | 9/1968 | Sotory | 98/1.5 |
| 3,657,992 | 4/1972 | Minnick, Jr. | 98/2.11 |
| 3,867,980 | 2/1975 | Traver | 165/59 X |
| 3,924,524 | 12/1975 | Whisler | 98/2.11 |
| 4,007,875 | 2/1977 | Stolz et al. | 98/2.11 X |
| 4,072,487 | 2/1978 | Irwin | 62/244 |
| 4,088,364 | 5/1978 | Termont | 98/2.14 X |
| 4,120,527 | 10/1978 | Lawrence | 98/2.11 X |
| 4,140,047 | 2/1979 | Bowman | 98/2.11 |

FOREIGN PATENT DOCUMENTS

| | | | |
|---|---|---|---|
| 1198983 | 8/1965 | Fed. Rep. of Germany | 98/38 F |
| 2115675 | 10/1972 | Fed. Rep. of Germany | 98/38 F |
| 754790 | 8/1956 | United Kingdom | 98/38 F |

Primary Examiner—Albert J. Makay
Assistant Examiner—Harold Joyce

[57] ABSTRACT

An air distribution system for a vehicle cab. The system uses two blowers: a first constant-volume blower for drawing fresh outside air into the cab and a second variable-speed blower for recirculating the inside air. An air filter is positioned upstream of both blowers for filtering out dust and other contaminants. As the fresh outside air passes through the first blower, it is mixed in a mixing zone with inside air which passes thorugh the second blower. This intermixed air is then passed through a temperature controller which includes a heating unit and an air conditioning unit. The temperature controller treats the air stream before it is routed through a series of ductwork to various parts of the operator's compartment of the cab. This two-blower air distribution system is a vast improvement over conventional air distribution systems in that it always provides for a positive air pressurization within the cab thereby preventing the influx of dust.

10 Claims, 4 Drawing Figures

AIR DISTRIBUTION SYSTEM

BACKGROUND OF THE INVENTION

1. Field of the Invention

This invention relates to an air distribution system and in particular to an air distribution system for a vehicle cab.

2. Description of the Prior Art

Various types of air distribution systems are presently available which utilize a single blower to draw air into and circulate it throughout a vehicle cab. Such systems work sufficiently well until the upstream air filter becomes clogged with dirt and dust. When this occurs, the system is no longer able to draw in fresh outside air and therefore starts to recirculate the stale inside air. By recirculating the stale inside air, two undesirable circumstances occur. First, the air pressure within the cab decreases to the point where dusty outside air is able to penetrate through the many small unsealed openings of the cab. This creates a very unpleasant environment for the operator because the incoming air has not been filtered or temperature treated. Secondly, the stale air within the cab is never exchanged with fresh outside air. This problem becomes acute if the operator is smoking, since the smoke-filled air is merely recirculated, thereby creating a haze within the cab.

These disadvantages are overcome by the present invention wherein a two-blower air distribution system is taught. A first constant-volume blower assures a constant amount of fresh incoming air, while a second, variable-speed blower controls the air circulation within the vehicle cab.

The general object of this invention is to provide an air distribution system for a vehicle cab. A more specific object of this invention is to provide an air distribution system for a vehicle cab which will allow for constant cab pressurization but still permit the operator to vary the air flow within the cab.

Another object of this invention is to provide a two-blower system wherein a first constant-volume blower draws in fresh outside air in order to maintain a constant cab pressurization while a second variable-speed blower controls the air circulation within the cab.

Still another object of this invention is to provide an air distribution system wherein the structural members of the cab serve as conduits for routing the outside air into the cab.

Still further, an object of this invention is to provide an air distribution system wherein the two blowers and a temperature controller are positioned on the floor of the cab, rather than in a roof member, so as to lower the center of gravity of the cab and therefore improve the ride characteristics of the vehicle.

Other objects and advantages of this invention will become apparent to one skilled in the art based upon the ensuing description.

SUMMARY OF THE INVENTION

Briefly, the present invention relates to an air distribution system for a vehicle cab. The air distribution system includes two blowers: a first blower for drawing fresh outside air into the cab and a second blower for recirculating the inside air. The air distribution system also contains an air filter for removing dust and other contaminants from the incoming air before the air passes into a mixing zone wherein it is mixed with recirculated cab air. Downstream of the mixing zone is a temperature controller which contains a heater and an air conditioning unit. The temperature controller is adjustable by the operator so that it can both regulate the flow of the passing air and also the temperature of the air. As the air passes through the temperature controller, it enters an air distribution ductwork which routes the air to various locations within the cab structure. Generally, these air flows are directed to impinge on the front, side and rear windows, as well as upon the seated operator.

Such an air distribution system is an improvement over the prior art in that it provides a positive pressurized atmosphere within the cab.

DETAILED DESCRIPTION OF THE INVENTION

Figure 1:
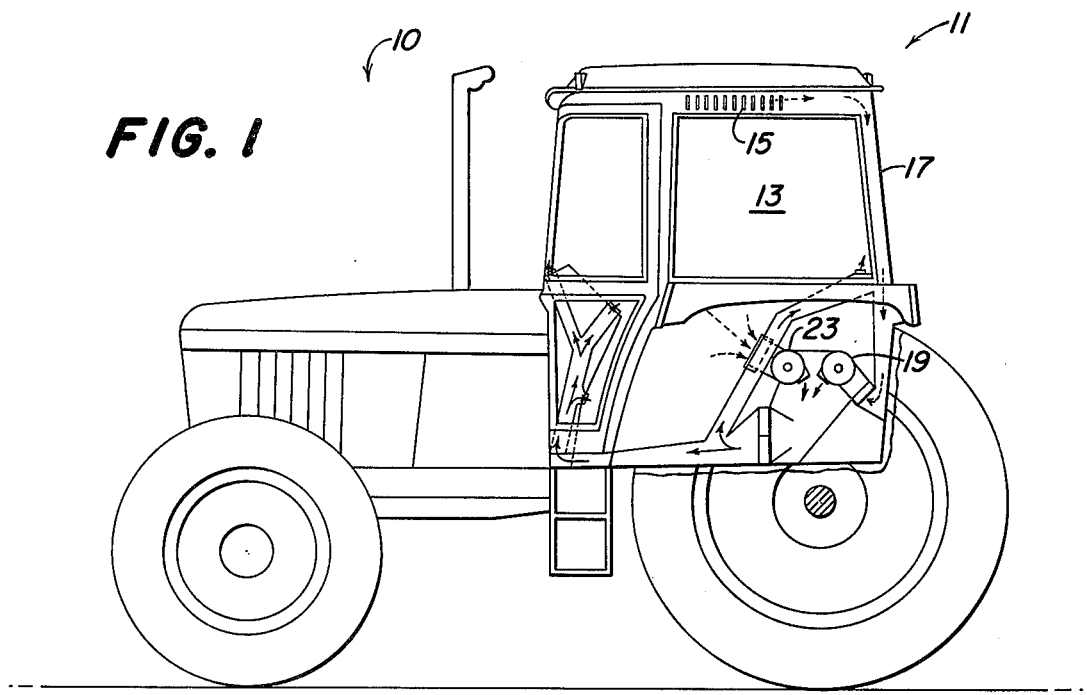
FIG. 1 is a side view of a tractor having a cab structure showing the air distribution system of this invention.
Figure 3:
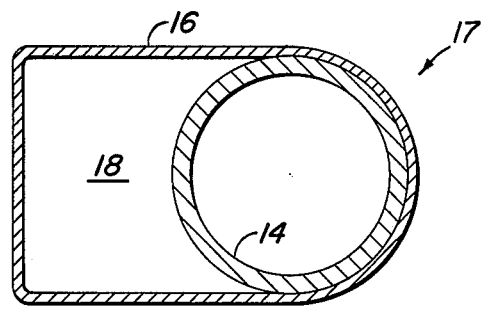
FIG. 3 is a sectional view of a support column in a cab with an associated air conduit.

Referring now to the drawings, FIG. 1 shows a tractor 10 having a cab 11 which defines an operator's compartment 13. Outside air is drawn into the cab 11 through a number of vents 15 which preferably are located in the upper half of the cab 11. Preferably, the vents 15 are located on each side of the cab 11 in close proximity to a vertical structural member 17. The reason for this is that the structural member 17 can serve as part of the support for a conduit through which the outside air is channeled into the operator's compartment 13. FIG. 3 shows one such configuration in which a roll-over protection bar 14 is encompassed by a closed member 16 to form an air conduit 18.

Figure 2:
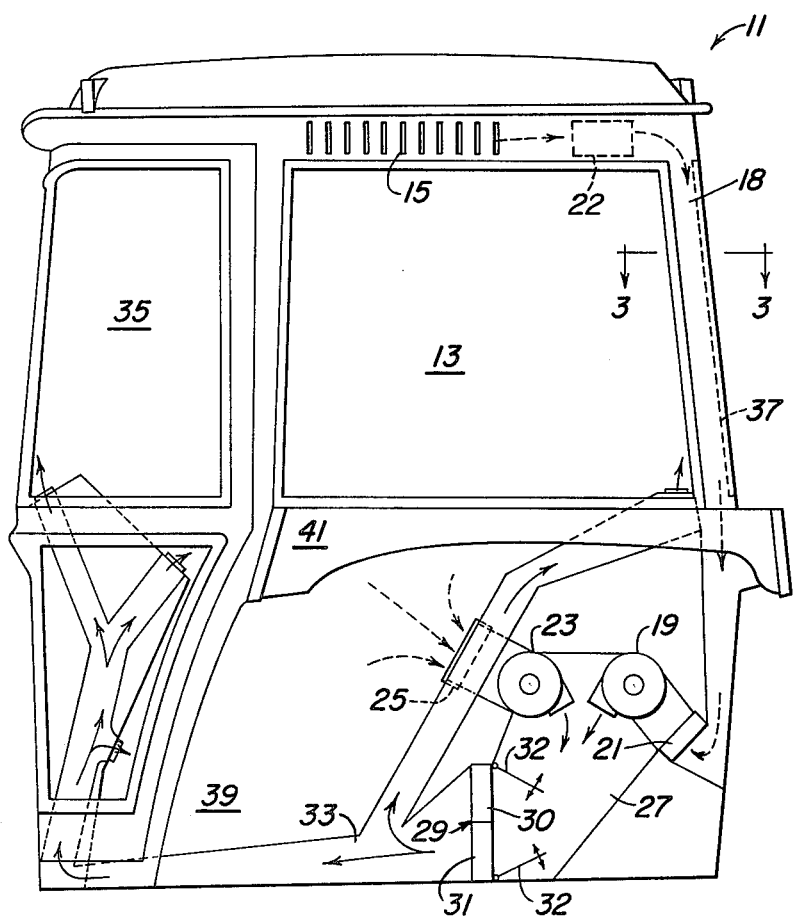
FIG. 2 is an enlarged side view of a vehicle cab employing the air distribution system of this invention.

Referring now to FIG. 2, the outside air is drawn into the vents 15 and through the air conduit 18 by a first blower means 19. The first blower means 19 is located near the bottom of the cab 11, preferably below and to the rear of the operator's compartment 13. The first blower means 19 can be any type of constant-volume blower but preferably is a single-speed, high-pressure, low-volume blower. The ability of the first blower means 19 to draw fresh outside air into the operator's compartment 13 at a constant volume is important, for it assures that a positive pressurized atmosphere will exist within the cab 11. This constant influx of air should be sufficient enough to compensate for any air that may escape from the cab 11 through the various openings in the dash, the control console or around the door or window seals. For example, if a normal air leakage from the cab 11 is assumed to be 100 cfm at 0.5 inches of water pressure, then the first blower means 19 should be designed to draw in approximately an equal amount of fresh air (100 cfm) and also overcome the pressure restrictions of the filters and the ductwork.

When a constant or positive air pressure is maintained within the cab 11, it assures that the direction of any air leak will be out of and not into the cab 11. When the outside air pressure is higher than that present within the cab 11, the dusty outside air will seep into the cab 11 and create an unpleasant environment for the operator. This is an undesirable feature which has to be avoided.

Located upstream of the first blower means 19 is a first air filter 21 which filters the fresh incoming air. The first air filter 21 can be constructed of any conventional material, with paper being the most preferred. The first air filter 21 can also be used in conjunction with a precleaner 22 which would in turn be situated upstream of the air filter 21. The precleaner 22 is desirable when the tractor 10 is used in a very dusty environment, such as is true when an agricultural tractor is employed in plowing or cultivating. In this case, the precleaner 22 would operate to remove about 50–90% of the dust contained in the fresh incoming air while the first air filter 21 would filter out a high percentage of the remaining contaminants. The use of the precleaner 22 will always aid in prolonging the life of the first air filter 21 but is not a necessity to this air distribution system.

A second blower means 23, arranged in close proximity to the first blower means 19, is also used in this air distribution system. This second blower means 23 is designed to recirculate the air within the cab 11 and therefore should be a variable-speed blower. The variable-speed blower allows the operator to adjust the output according to his preference. Preferably, the second blower means 23 is a three-speed, low-pressure, high-volume blower. Like the first blower means 19, the second blower means 23 can have an air filter 25 positioned upstream to filter out contaminants which may be present in the inside air. Two contaminants which are commonly found in the inside air are exhaust fumes which can enter the cab 11 from the engine and cigarette smoke generated by an operator who is smoking.

The first and second blower means 19 and 23, respectively, discharge their respective air streams into a mixing zone 27. This mixing zone 27 provides a chamber in which the two air streams can mix before being routed downstream. The mixing assures that fresh incoming air can replace a portion of the stale inside air. Situated downstream of the mixing zone 27 is a temperature controller 29 which will condition the air flow passing through it. The temperature controller 29 includes a heating unit 30 and an air conditioning unit 31. The two units 30 and 31 preferably are arranged in a side-by-side configuration because normally both operate simultaneously. The reason for this simultaneous operation is to condition the air so as to provide for a more uniform environment, that is, an environment without extreme hot or cold temperatures. The degree of operation of each unit 30 or 31 will vary depending upon the operator's wishes. For example, on a warm day, both units 30 and 31 would be operating simultaneously with the air conditioning unit 31 operating to a greater extent than the heating unit 30; while on a cold day, the heating unit 30 would be operating to the greater extent. This air distribution system also allows for the air to pass through the temperature controller 29 without being elevated or lowered in temperature, such as may be the desire of the operator on a nice day.

The temperature controller 29 also includes regulatory means 32 that controls the amount of air which passes through the heating unit 30 and the air conditioning unit 31. In FIG. 2, the regulatory means 32 is depicted as two simple pivotal doors which are capable of swinging between an open and a closed position. However, any type of regulating means known to those skilled in the art can be used.

The mixed air that passes from the mixing zone 27 through the temperature controller 29 is funneled into hollow ductwork 33 which distributes the air to various locations within the operator's compartment 13. Commonly, this air is distributed to the front window 35, the rear window 37, the floor area 39 and the midsection of the operator's compartment 13. The number of openings, along with their size and location, is strictly a matter of choice and can be varied to suit the particular needs of an individual.

Figure 4:
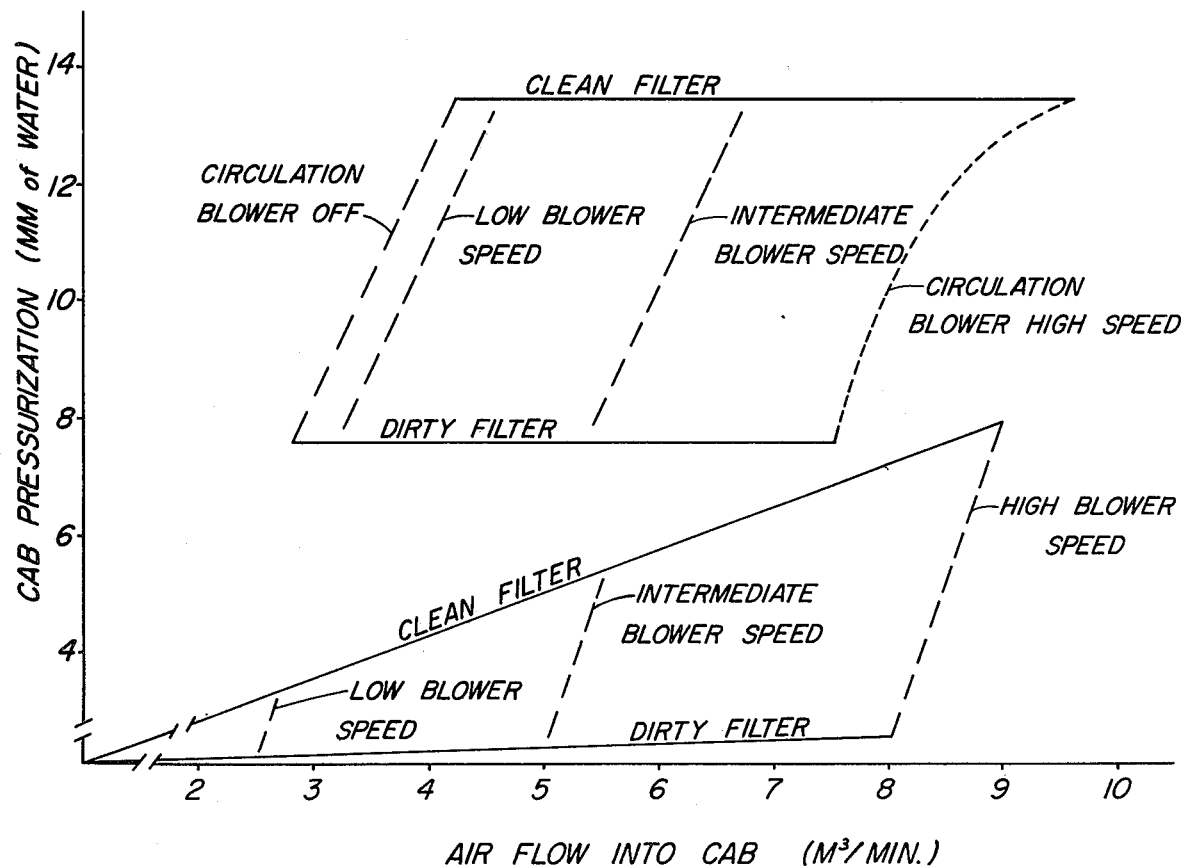
FIG. 4 is a graph depicting data acquired using the new air distribution system versus a current single-blower design.

Such a positive pressure air distribution system is particularly useful on agricultural tractors and other off-road equipment where a dusty or dirty environment is most likely to be encountered. FIG. 4 shows a comparison of test data collected comparing the improved air distribution system of this invention to a commercially available single-blower design. As can readily be seen, the new system is far superior to the present system for the entire range of air flow. The x-axis represents air flow in cubic meters per minute into the cab 11 and the y-axis represents the air pressurization within the cab 11. The lower chart shows the ability of the current single-blower design to function with a clean or dirty filter at three different blower speeds. As can be seen, the cab pressurization falls off toward zero when the blower speed is decreased and as the filter becomes dirty. With the two-blower design, not only is the cab pressurization kept constant but it is maintained at a much higher level. These higher pressurization values can even be maintained when the filters are dirty, something that is not possible with the single blower design.

While the invention has been described in conjunction with a specific embodiment, it is to be understood that many alternatives, modifications, and variations will be apparent to those skilled in the art in light of the aforegoing description. Accordingly, it is intended to embrace all such alternatives, modifications, and variations which fall within the spirit and scope of the appended claims.

We claim:

1. An air distribution system for a vehicle cab comprising:
    (a) a pair of spaced-apart hollow members contained in said cab, each having two separate chambers, one chamber structure providing support for said cab and the second chamber providing an air channel for incoming air and which communicates with an opening in said cab;
    (b) a partition dividing an internal area of said cab into a first compartment and an air mixing zone;
    (c) constant-volume blower means for drawing fresh air through said second chamber of each of said hollow members and into said mixing zone and maintaining a positive pressure therein;
    (d) a first air filter positioned upstream of said constant volume blower means for filtering the incoming air;
    (e) hollow ductwork extending through said partition for routing air from said mixing zone to said first compartment;
    (f) variable-speed blower means for recirculating the air from said first compartment into said mixing zone wherein the air is mixed with the incoming fresh air;
    (g) a second air filter positioned upstream of said variable-speed blower means for filtering the air from said first compartment; and (h) a temperature controller positioned downstream of both said constant-volume blower means and said variable-speed blower means and adjacent to an entrance to said hollow ductwork for conditioning the air passing therethrough.

2. The air distribution system of claim 1 wherein a precleaner is installed upstream of said first filter.

3. The air distribution system of claim 11 wherein said constant-volume blower means is a high-pressure, low-volume blower.

4. The air distribution system of claim 11 wherein said variable-speed blower means is a low-pressure, high-volume blower.

5. The air distribution system of claim 1 wherein said temperature controller contains side-by-side heating means and cooling means.

6. The air distribution system of claim 5 wherein said heating and cooling means are operated simultaneous to condition separate portions of the air in said mixing zone.

7. The air distribution system of claim 5 wherein said cooling means is an air conditioning unit.

8. The air distribution system of claim 5 wherein said temperature controller containing regulatory means for regulating the amount of air from said mixing zone which passes through said heating means and said cooling means.

9. An air distribution system for a vehicle cab comprising:
(a) a pair of spaced-apart hollow members contained in said cab, each having two separate chambers, one chamber structure providing support for said cab and the second chamber having an opening in said cab communicating with the outside air for routing the outside air into said cab;
(b) a partition dividing the interior of said cab into a first compartment and an air mixing zone;
(c) a constant-volume blower connected to said second chamber of each of said hollow members for drawing the outside air into said mixing zone and for maintaining a positive pressure therein;
(d) a precleaner positioned upstream of said constant-volume blower for filtering the incoming outside air;
(e) a first filter positioned upstream of said constant-volume blower and downstream of said precleaner for filtering the incoming outside air;
(f) hollow ductwork extending through said partition for routing air between said first compartment and said mixing zone;
(g) a variable-speed blower positioned between said first compartment and said mixing zone for recirculating the air from said first compartment into said mixing zone;
(h) a second air filter positioned upstream of said variable-speed blower for filtering the air passing through said variable-speed blower; and
(i) temperature control means for conditioning the air in said mixing zone before the air passes through said ductwork to said first compartment, said temperature control means including side-by-side heating means and cooling means which operate simultaneously to condition a separate portion of the air in said mixing zone before the air enters said ductwork.

10. The air distribution system of claim 9 wherein said temperature control means contains regulatory means for regulating the air flow through both said heating means and said cooling means.

* * * * *

UNITED STATES PATENT AND TRADEMARK OFFICE
CERTIFICATE OF CORRECTION

PATENT NO. : 4,344,356
DATED : 17 August 1982
INVENTOR(S) : Robert H. Casterton, Larry J. Phippen and Darrell L. Wright It is certified that error appears in the above-identified patent and that said Letters Patent is hereby corrected as shown below:

Column 5, lines 8 and 11, delete "11" and insert -- 1 --.

Signed and Sealed this

Fifth Day of July 1983

[SEAL]

Attest:

GERALD J. MOSSINGHOFF

Attesting Officer

Commissioner of Patents and Trademarks